US009604274B2

(12) United States Patent
Gariglio et al.

(10) Patent No.: US 9,604,274 B2
(45) Date of Patent: Mar. 28, 2017

(54) BILLET TRANSFER LINE CLEAN-OUT DEVICE AND METHOD

(71) Applicant: Inter-Power Corporation, Almont, MI (US)

(72) Inventors: Gary M. Gariglio, Metamora, MI (US); Edward P. Potoczak, Rochester Hills, MI (US); Brian C. Smith, Almont, MI (US); David J. Wagner, Port Huron, MI (US); James W. Nankervis, Imlay City, MI (US); Patrick H. McRee, Lapeer, MI (US)

(73) Assignee: INTER-POWER CORPORATION, Almont, MI (US)

( * ) Notice: Subject to any disclaimer, the term of this patent is extended or adjusted under 35 U.S.C. 154(b) by 0 days.

(21) Appl. No.: 14/676,922

(22) Filed: Apr. 2, 2015

(65) Prior Publication Data
US 2016/0023263 A1     Jan. 28, 2016

Related U.S. Application Data

(60) Provisional application No. 62/029,035, filed on Jul. 25, 2014.

(51) Int. Cl.
*B21D 43/00* (2006.01)
*B65G 19/02* (2006.01)
(Continued)

(52) U.S. Cl.
CPC .......... *B21D 43/006* (2013.01); *B21F 23/005* (2013.01); *B21J 13/08* (2013.01);
(Continued)

(58) Field of Classification Search
CPC .......... B65G 19/02; B65G 19/28; B65G 25/04
(Continued)

(56) References Cited

U.S. PATENT DOCUMENTS 3,096,889 A * 7/1963 Vekovius .................. B24B 7/02
                                                   198/413
3,134,475 A * 5/1964 Di Lella ............... B21B 39/002
                                                   198/468.6
(Continued)

FOREIGN PATENT DOCUMENTS

JP      H06 238301 A    8/1994
WO         9108089 A1   6/1991

OTHER PUBLICATIONS

SMS Elotherm GmbH, iZone Innovation, https://web.archive.org/web/20130510101215/http://www.sms-elotherm.com/en/products/induction-heating.html, May 10, 2013.
(Continued)

*Primary Examiner* — Douglas Hess
(74) *Attorney, Agent, or Firm* — Young Basile Hanlon & MacFarlane, P.C.

(57) ABSTRACT

A processing line material clear out devices and methods are disclosed. The device is particularly useful for clearing metal billets from induction heating units, but may be used for many other processes having sequentially ordered materials traveling down a conveyor or other processing line. In one example of the invention, a reciprocating push rod rack is used to sequentially deposit and remove at least two push rods used to abut and clear the downstream billets. A push rod advance device is used to interlink independent, sequential push rods positioned on the billet track. On clearing of the billets, the push rods are retracted, removed from the billet track and stored on the push rod rack for ready use.

19 Claims, 10 Drawing Sheets

(51) Int. Cl.
| | |
|---|---|
| *B65G 19/28* | (2006.01) |
| *B65G 25/04* | (2006.01) |
| *B65G 35/00* | (2006.01) |
| *B21J 13/08* | (2006.01) |
| *B65G 25/08* | (2006.01) |
| *B21K 27/02* | (2006.01) |
| *B21F 23/00* | (2006.01) |
| *C21D 9/00* | (2006.01) |
| *F27D 3/04* | (2006.01) |

(52) U.S. Cl.
 CPC .............. *B21K 27/02* (2013.01); *B65G 25/08* (2013.01); *C21D 9/0075* (2013.01); *F27D 3/04* (2013.01)

(58) Field of Classification Search
 USPC ....... 198/617, 717, 727, 728, 738, 739, 741, 198/747; 414/745.3, 745.7, 745.8, 746.6
 See application file for complete search history.

(56) References Cited

U.S. PATENT DOCUMENTS

| | | | | | |
|---|---|---|---|---|---|
| 3,618,741 | A | * | 11/1971 | Berndt | B23Q 7/106 198/463.5 |
| 3,631,959 | A | * | 1/1972 | Gipperich | B22D 11/126 198/468.6 |
| 3,759,401 | A | * | 9/1973 | Kreuz | B65G 47/252 198/394 |
| 3,768,626 | A | * | 10/1973 | Vossler | B65G 35/00 198/396 |
| 4,023,685 | A | * | 5/1977 | Bishop | B21B 39/22 198/413 |
| 4,125,365 | A | * | 11/1978 | Nelson | C21D 9/0081 198/742 |
| 4,619,717 | A | * | 10/1986 | Balzer | B21J 1/06 148/112 |
| 5,109,740 | A | * | 5/1992 | Kohn | B21D 43/28 83/15 |
| 5,415,381 | A | * | 5/1995 | Beiletti | B21J 1/06 266/87 |
| 5,450,943 | A | * | 9/1995 | Yew | B65G 25/08 198/468.6 |
| 6,149,376 | A | * | 11/2000 | Peting | B22D 13/10 148/594 |
| 6,199,461 | B1 | * | 3/2001 | Geiser | B23B 13/02 82/124 |
| 7,497,985 | B2 | * | 3/2009 | Fuchs | F27D 3/04 198/717 |
| 8,257,010 | B2 | * | 9/2012 | Hirosawa | B23B 13/10 414/746.1 |
| 8,573,100 | B2 | * | 11/2013 | Schmidt | B23B 13/02 82/126 |
| 8,915,694 | B2 | * | 12/2014 | Rigolone | B23B 13/02 414/745.9 |
| 9,114,936 | B2 | * | 8/2015 | Yokota | B65B 25/08 |
| 9,127,887 | B2 | * | 9/2015 | Alfieri | B65G 25/02 |

OTHER PUBLICATIONS

SMS Elotherm Gmbh, iZone Innovation, http://www.sms-elotherm.com/en/products/induction-heating/energy-management-izone.html, Jun. 11, 2015.
European Search Report for corresponding European Publication No. EP 2 977 122 A1, dated Nov. 30, 2015.

* cited by examiner

BILLET TRANSFER LINE CLEAN-OUT DEVICE AND METHOD

CROSS-REFERENCE TO RELATED APPLICATIONS

This application claims priority benefit to U.S. Provisional Patent Application No. 62/029,035 filed Jul. 25, 2014 the entire contents of which is incorporated herein by reference.

TECHNICAL FIELD

The present invention generally pertains to the field of metal forming devices and processes. The present invention is not limited to, but is particularly useful with systems that transfer metal billets through induction heating devices for mass heating as preparation for forging and other forming processes.

BACKGROUND

Induction heating lines are necessary and valuable systems to adequately prepare metal billets for subsequent metal forming or surface treating processes. Induction heating systems typically employ a transfer line beginning with a hopper where bulk, similarly shaped metal billets are deposited for transport down a process line.

Common load side material handling systems typically will first consist of a linear in feed vibratory track or chain conveyor onto which the billets will be directly loaded from a vibratory bowl feeder or hopper where a plurality of billets are deposited for processing. Exiting the bowl feeder or hopper, the billets are oriented in a single file, sequential line and typically advanced along by a linear in feed vibratory track or chain conveyor toward a variable speed, carefully controlled pinch wheel mechanism that will forcibly advance the abutting, sequentially oriented billets through a downstream induction heating coil line. Due to the weight of the billets, the pinch wheel steadily and continuously advances the billets at a rate determined by the requirements of the heating process for the billet material, size, length, and subsequent metal forming or surface treating process. The pinch wheel may automatically adjust in vertical height or clearance and rotational speed to accommodate a different diameter of billet between production runs.

Conventional induction heating coil lines often includes several self-contained modular billet heating chambers or units sequentially positioned one after another along the billet process line. The billet heating line may range in total length from about 10 feet to over 80 feet depending on the number of coils based on requirements for the heating and downstream processes. The track supporting the billets passes through a tunnel in each induction-heating unit whereby the billets are passed within proximity of the induction heating coils. The heated billets emerge from the heating coil line and typically onto a high-speed exit conveyor. As a billet exits the heating coil line, the billet is typically "broken" from the billet behind it through an extractor roll. As the billet exits the heating coil line, the billet is typically checked for temperature by means of an optical pyrometer or other temperature measuring device.

It is common for high volume metal forming businesses to change the type of billets to be transferred through the induction heating line. For example, at the end of a run of a first billet alloy or size, the manufacturer may order a second different billet alloy or size to be processed. When a changeover occurs to a billet having a different alloy or size, other parameters of the induction heating process need to be changed, for example, the rate at which the billets are advanced through the heating units may have to increase or decrease to achieve the desired heating of the billet. Alternately, the manufacturer may have to shut the line down at the end of a shift or for other reasons, such as maintenance or repair of the system.

In these instances of billet changeover or line shut down, once the last billet of the run passes through the pinch rollers, there is no longer forced advancement of the line of billets presently in the heating units. Manufactures need to exit or "clear" the line and run out all of the remaining billets in the heating unit portion of the line. Historically, manufactures used manual means, such as a long pole, to forcibly push on the last in line billet and force the preceding billets in the heating units past the exit of the last heating unit to "clear" the line. The billets inside the coils can be very heavy and be difficult to manually push. Other methods have been employed, for example, feeding wooden or "dummy" billets behind the last production billet to keep the production billets advancing through the heating units. Any stoppage or deviation from the carefully monitored advancement of the billets line inside the heating units alters the heating process and results in non-standard billets, which often require reprocessing or have to be repurposed. Even where dummy billets are used to advance the line, these dummy billets have to be cleared from the heating units through one of the means described above. Any non-standard production billets or dummy billets that need to be removed from the production billets are thermally hot having absorbed a large amount of electrical energy via induction heating and are often heavy which requires additional precautions for workers or equipment used to remove and segregate them from the processed production billets.

Automated clean-out devices have been employed, but have substantial limitations and disadvantages. In one automated clean-out device, a large spool of interlinked, chain-like, dummy billets has been employed upstream of the pinch rollers. At the end of a billet run, the spool begins to advance the linked dummy billets to advance the remaining billets through the heating units. Once the billets were cleared from the heating units, the spool would reverse and retract the interlinked dummy billets back onto the spool. These prior spool devices had many disadvantages, as they were large in size, heavy and complex in design. Further, the size of the interlinked dummy billets was fixed per spool, which may limit its use to clear only certain types of billets. Due to the size and weight of the spool, it was not feasible to change a spool to accommodate the many changes in the billet production schedule reducing usefulness and efficiency of the entire production heating line.

An automated clean-out device and method is needed to greatly improve on prior designs and provide an efficient, safe and cost effective solution for manufacturers.

BRIEF SUMMARY

An automated billet clean-out device and methods of use are disclosed and illustrated. The device is especially useful for metal billet induction heating systems, although other applications are contemplated.

The device includes a transversely positioned, reciprocating push rod rack for selectively and sequentially depositing a plurality of independent push rods into the billet production line to maintain the desired rate of advancement, finish heating and then clear remaining billets from the heating units. Once inserted into the production line, the rods are forcibly connected to form an interlinked rod. Once the production billets are cleared, the interlinked rod is retracted and individual push rods are automatically unlinked, deposited back on the rod rack and removed from the production line until another changeover or stoppage occurs. The plurality of individual push rods can also be quickly and easily changed to accommodate changes in the type of billets to be processed. For larger size or number coil applications the racking system can be expanded along with the length of each push rod within the system to accommodate a longer coil system.

The inventive automated clear out device and process eliminates or greatly improves on long-standing problems of clearing out a heating line, which increases the efficiency of the entire line. The inventive device and process can easily be added to existing material transfer systems or provided as original equipment in new systems.

One significant advantage of the present invention is the elimination of the prior manual billet clean out process or a significant reduction in required manual processes of prior systems. Another significant advantage of the present invention is in labor savings and the elimination of re-work billet scrap. Also, this automated device helps to reduce waste of electrical energy used to inductively heat billets that are inside the heating units after the last one has exited the pick roll. It is anticipated that these machines will be of great value and sold throughout the forging industry.

Other advantages, applications and uses known by those skilled in the art will be apparent on reviewing the below description of examples and accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
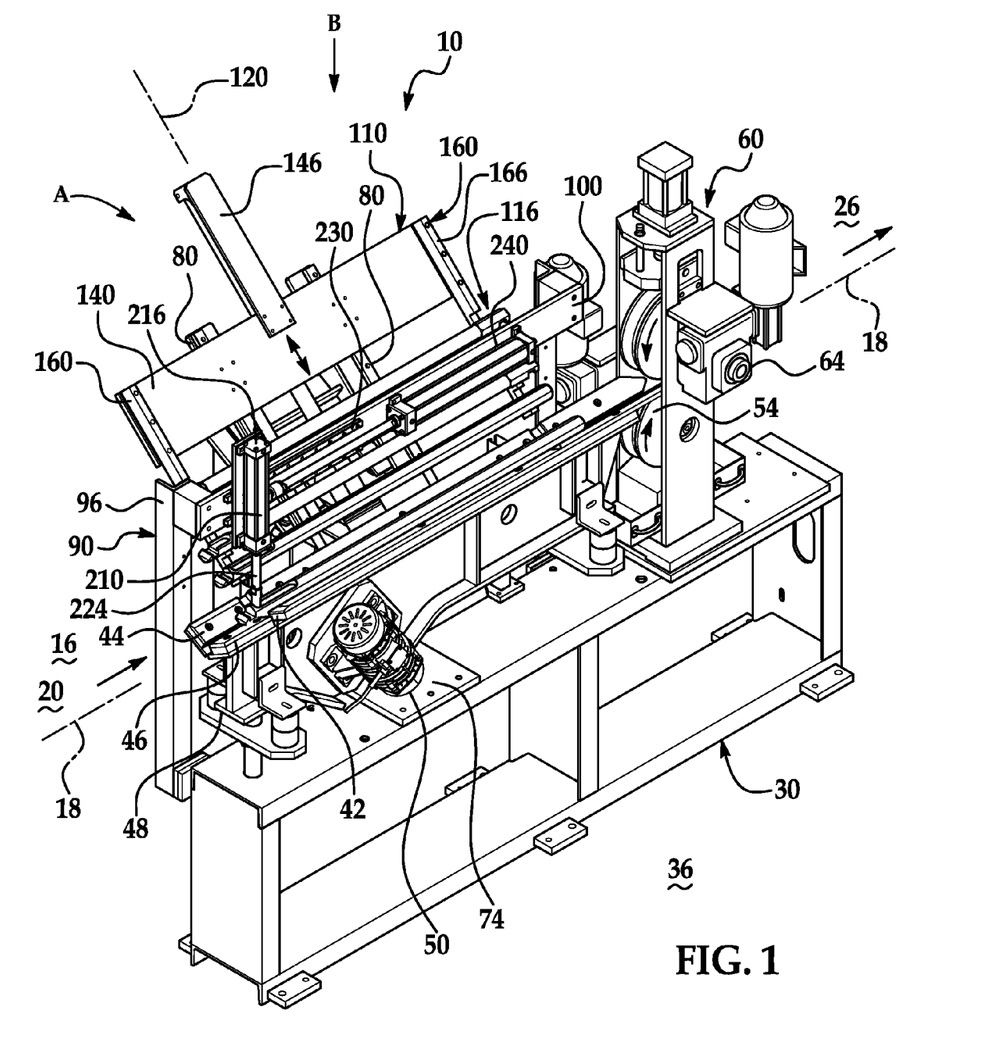
FIG. 1 is a perspective view of one example of an automated billet clean-out device.

Referring to FIGS. 1-14, examples of a billet transfer line clean-out device 10 (referred hereinafter as billet device 10) and methods are disclosed. Referring to FIG. 1, the billet device 10 is described and illustrated in an exemplary application in a metal billet induction heating line. It is understood that the billet device 10 has other industrial applications beyond billet processing lines as known by those skilled in the art.

In the exemplary use, billet device 10 is positioned along a material or billet induction line 16 defining a material or billet path of travel 18. The billet device 10 is positioned proximate and preferably directly adjacent to the path of travel 18 between a material or billet inlet end 20 and a material exit or billet induction-heating end 26. The billet induction heating end 26 would include one or more induction heating units having induction heating coils (not shown) positioned along the billet path of travel 18. In normal production, the billets would move from the lower left to the upper right in FIG. 1.

The billet transfer system may include a track support 30 securely mounted to a manufacturing facility floor 36. A material or billet track 40 is positioned along the billet path of travel 18 and is typically connected to track support 30 as generally shown. It is common for the billet track 40 to be used with a billet advancement device, for example a vibratory device 50, to advance the billets on track 40 along the path of travel 18. In one example, pinch rollers 54 are positioned downstream prior to the induction heating units to further advance the billets at precisely controlled rates. In the example illustrated, pinch rollers 54 which are shown supported by a roller tower 60. An electric motor 64 drives the pinch rollers and is in electronic communication with a programmable controller (not shown) to selectively activate and control the motor 64 to selectively advance sequentially oriented billets along the path of travel 18. It is understood that other billet advancement or transfer system components other than driven pinch rollers and in alternate configurations known by those skilled in the art may be used.

Figure 2:
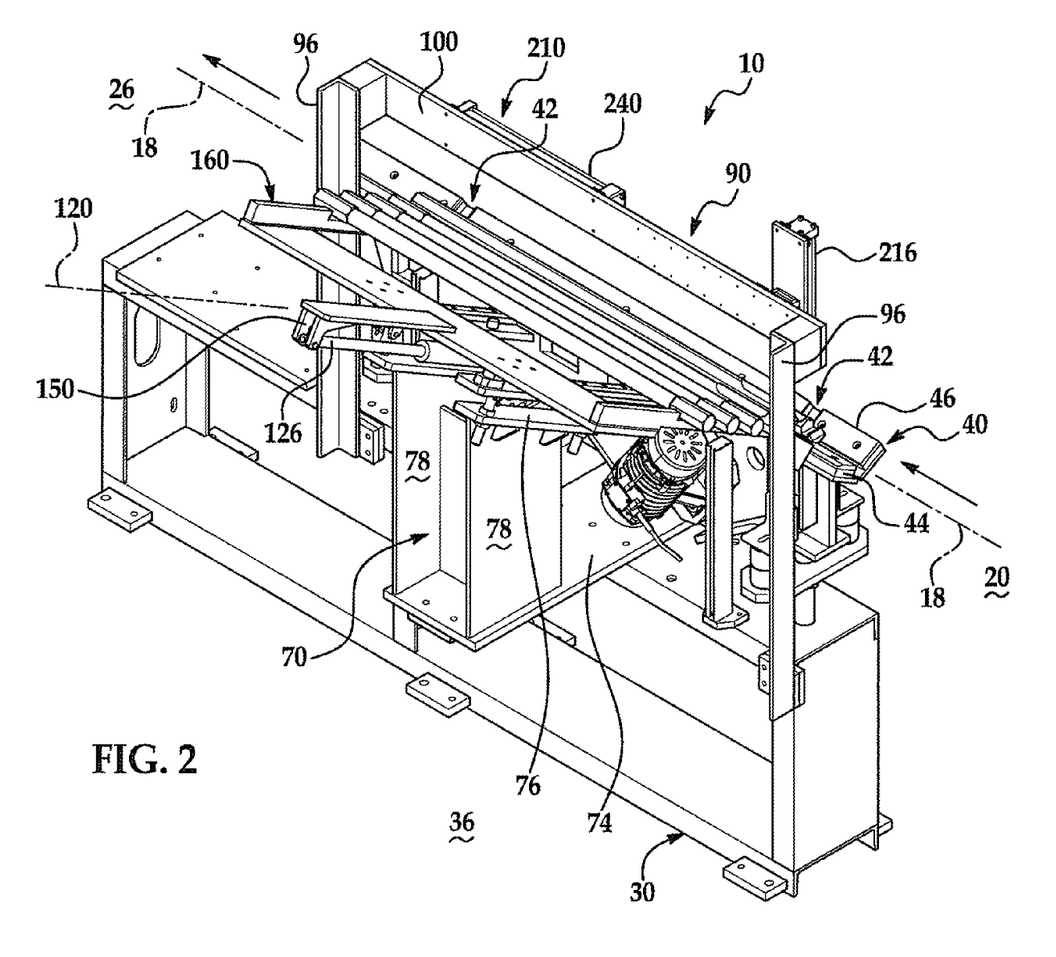
FIG. 2 is a rearward perspective view taken from a direction A in FIG. 1.
Figure 3:
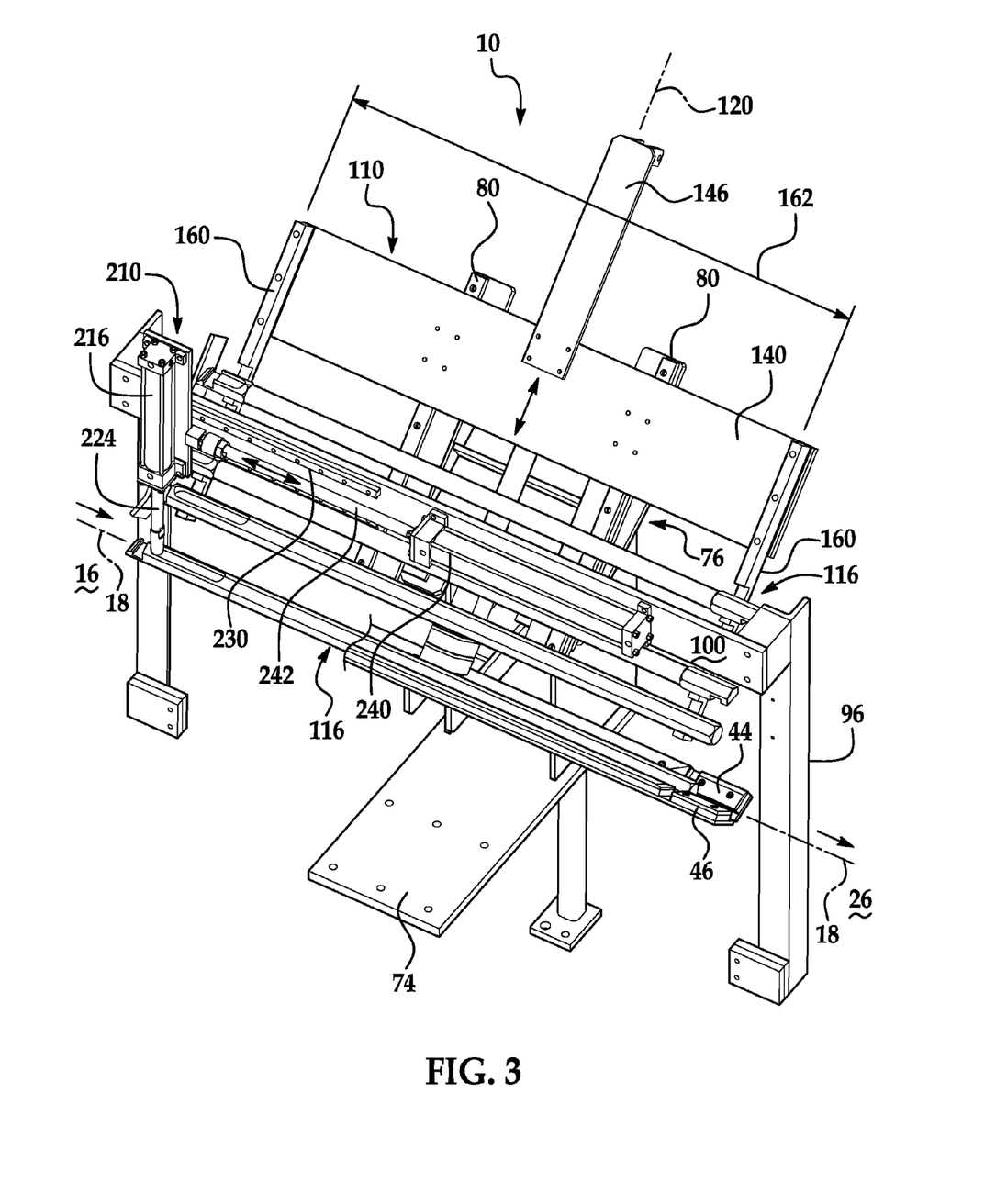
FIG. 3 is a downward perspective view taken from a direction B in FIG. 1.

As best seen in FIGS. 2 and 3, exemplary billet device 10 includes a base 70 having a mounting plate 74. An angled support 76 is connected to the plate 74 by risers 78 and includes guide rails 80 extending along the angled support. It is understood that alternate angled brackets and supports may be used as known by those skilled in the art.

Exemplary billet device 10 further includes a frame 90 having opposing uprights 96 and a cross member 100 extending between, and connecting to, the uprights 96. It is understood that different frame components and configurations may be used as known by those skilled in the art. Base 70, angled support 76 and frame 90 may be made from steel, aluminum or other materials, and be constructed in different configurations to suit the particular application, as known by those skilled in the art.

As best seen in FIGS. 1 and 3, the exemplary billet device 10 preferably includes a push rod rack 110 for storing and transferring a plurality of push rods 116 as further described below. Exemplary push rod rack 110 is connected to angled support 76 and is selectively and reciprocally movable along a rack path of travel 120 by guide rails 80 by a push rod rack reciprocating device, preferably a pneumatic or hydraulic cylinder 126 as further described below.

In one example of the push rod rack 110, push rod rack 110 includes a rack plate 140 having an extension arm 146 and a clevis 150 as best seen in FIG. 2. Exemplary cylinder 126 is connected to the base 30 on one end and clevis 150 on the piston end of the cylinder 126 as generally shown. Cylinder 126 is in fluid communication with a source of pressurized air or hydraulic fluid and an actuator (not shown) which is in electronic communication with a programmable controller (not shown) for selective activation and movement of the cylinder 126 and push rod rack 110 relative to the billet track 40 and billet path of travel 18.

Figure 13:
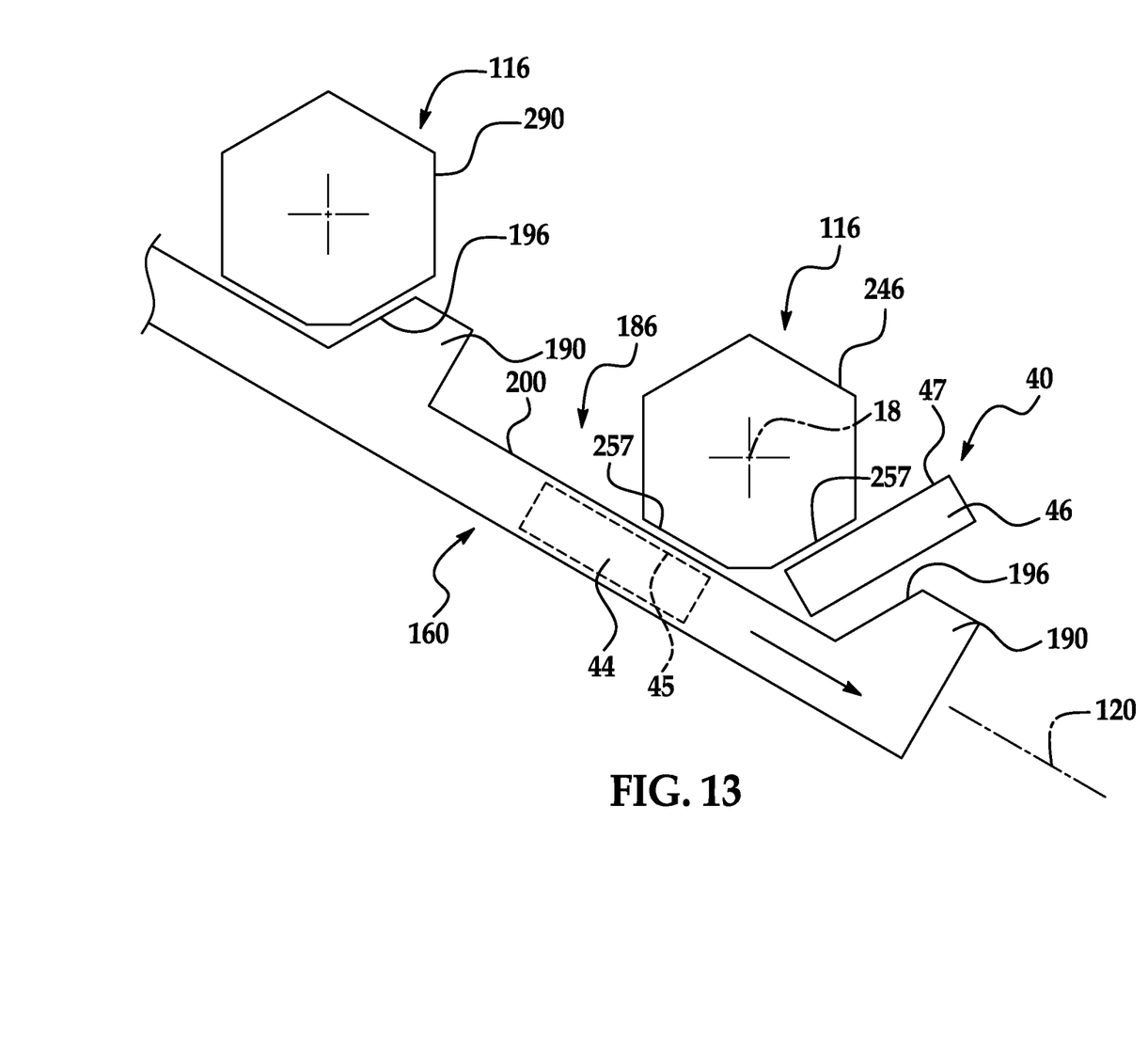
FIG. 13 is an enlarged schematic cut-away view through a break in the billet track showing movement of the rack rail through the billet track and depositing a push rod on the billet track for advancement.

In the example, push rod rack 110 further includes a pair of rod rack rails 160 separated by a first distance 162 generally parallel with the billet track 40. In the example, the rod rack rails 160 are connected on opposite ends of rack plate 140 and extend toward billet track 40. As best seen in an the alternate examples of rack rails 160 shown in FIGS. 4A and 4B, rack rail 160 includes a mounting portion 166 having a first thickness 172 and a push rod support portion 170. In the example, rod support portion 170 includes a plurality of channels 186 having a first channel surface 200 and rack bar stops 190. Rack bar stops 190 include angled surfaces 196, which compliment angled facets 256 of the push rods 116 as further described below. As best seen in FIG. 13, in a preferred example, the channel first surface 200 is parallel with the billet track first rail 44 contact surface 45 and the stop angled surface 196 is parallel with billet track second rail 46 contact surface 47.

Figure 4A:
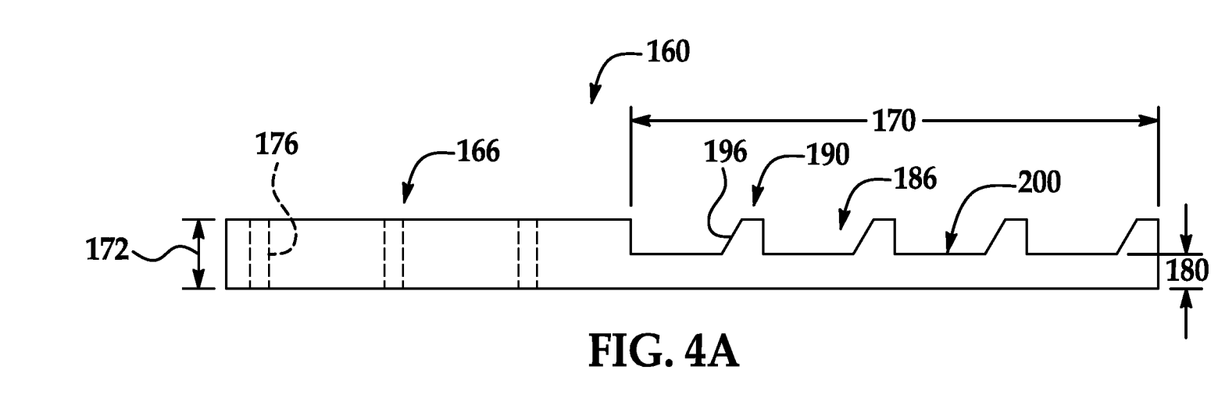
FIG. 4A is a side view of one example of a push rod rack rail.
Figure 4B:
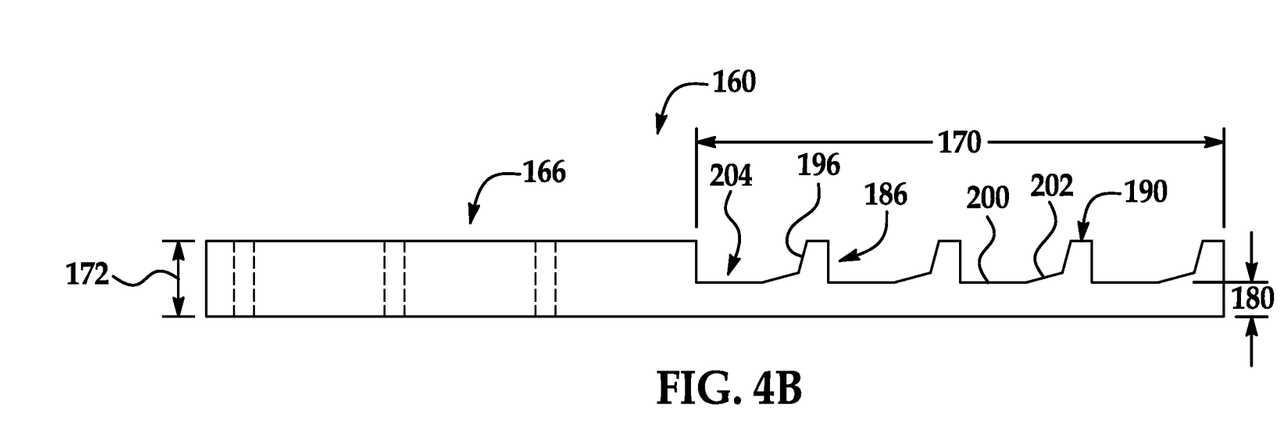
FIG. 4B is a side view of an alternate push rod rack rail.

Rack rails 160 are positioned so that the respective channels 186 on the rack rails 160 are aligned for substantially horizontal support of push rods 116 as generally shown. As shown in the alternate examples, the bottom portion or support surface 198 of channels 186 may include a first surface 200 or single facet as shown in FIG. 4A or include a second channel surface 204 multiple facets as shown in FIG. 4B to accommodate or compliment the exterior shapes or facets of the push rods 116 in use. It is understood that rack rails 160, channels 186 and stops 190 may take other forms, sizes, shapes and orientations to suit the particular application and push rod configuration as known by those skilled in the art.

Referring to FIG. 13, in a preferred example, the positional angle of push rod rack 110 and path of travel 120 of push rod rack 110 is aligned or substantially parallel to the immediately adjacent billet track 40 first rail 44 (shown in hidden line in FIG. 13) allowing both rack rails 160 to pass through a respective break 42 or discontinuity in the billet track 40 as been seen in FIG. 2. In a preferred example, the rod rack rails and billet track discontinuity breaks 42 are both spaced a first distance 162 apart allowing at least a portion of the rod rack bars 160 to pass through at least a portion of the track discontinuity breaks to deposit or remove the push rods as described herein. It is understood that other methods or structures for depositing and removing the push rods to and from the billet track 40 or other conveyor system may be used as known by those skilled in the art.

In one example, the angle of push rod rack 110 is approximately 35 degrees from horizontal. It is understood that other angles may be used. As further explained below, as push rod rack 110 continues along path of travel 120, the lowermost positioned push rod 116 spanning the discontinuity breaks 42 abuttingly engages second rail 46 of billet track 40, thereby depositing push rod 116 on billet track 40 for advancement along the billet path of travel 18. The described and illustrated push rod rack 110 components may be made from steel, aluminum or other materials, and in alternate configurations to suit the particular application and performance specifications, as known by those skilled in the art.

Although push rod rack 110 rack rails 160 are described as connected to or fixed to the billet device 10, it is understood that push rod rack 110 can take other structures, for example a removable rack (not shown). In the alternate example of push rod rack 110 (not shown), push rod rack 110 may be a removable rack/cartridge/magazine that has certain push rods for the rack. For example, on change over to a billet or other material that the first 246 and second 290 push rods are not well suited, the rack 110 with these push rods 246 and 290 could be quickly removed and replaced with an alternate rack with different push rods suitable for the processing line after change over. Alternately, rods 246 and 290 can simply be replaced with different push rods by manual or automated means.

In an alternate example of push rod rack 110 (not shown), push rod rack 110 may be an automated device wherein alternate sets of different push rods for different billets or applications may be stored adjacent to the push rod rack 110. An automated device, for example a conveyor or programmable robot may remove push rods 246 and 290 from push rod rack 110 and replace them with alternate push rods in a predetermined order and orientation on rod rack 110 suitable for the changeover and new billets or alternate materials to be processed. Other methods and devices for changing the push rods known by those skilled in the art may be used.

Referring back to FIG. 1, a preferred example of billet device 10 further includes a push rod advance or interlink device 210. Advance device 210 preferably includes a rod engagement cylinder 216 having a piston and end 224. Cylinder 216 is preferably pneumatic and is connected to a pressurized air source and a programmable controller (not shown) to selectively move end 224 to and from a downward position whereby the piston end 224 is below the upper surface of a push rod 116 positioned on billet track 40 so as to engage a push rod first end 260 as further described below. It is understood that devices other than a cylinder and piston may be used to engage the push rods as known by those skilled in the art.

Push rod advance device 210 further includes a rod advance cylinder 240 to selectively move rod engagement cylinder 216 parallel to the billet path of travel 18. Advance cylinder 240 is mounted to cross member 100 and guided by a track 230 defining an advance path of travel for the exemplary rod engagement cylinder 216 as generally shown. Cylinders 216 and 240 are preferably pneumatic and in electronic communication with an actuator and programmable controller (not shown) for selected movement as further described herein. Other components and methods for moving and interlinking push rods 116 other than cylinders known by those skilled in the art may be used. For example, a rack and pinion gear or combinations of powered gears may be used to move piston end 224 vertically and horizontally.

Figure 5:
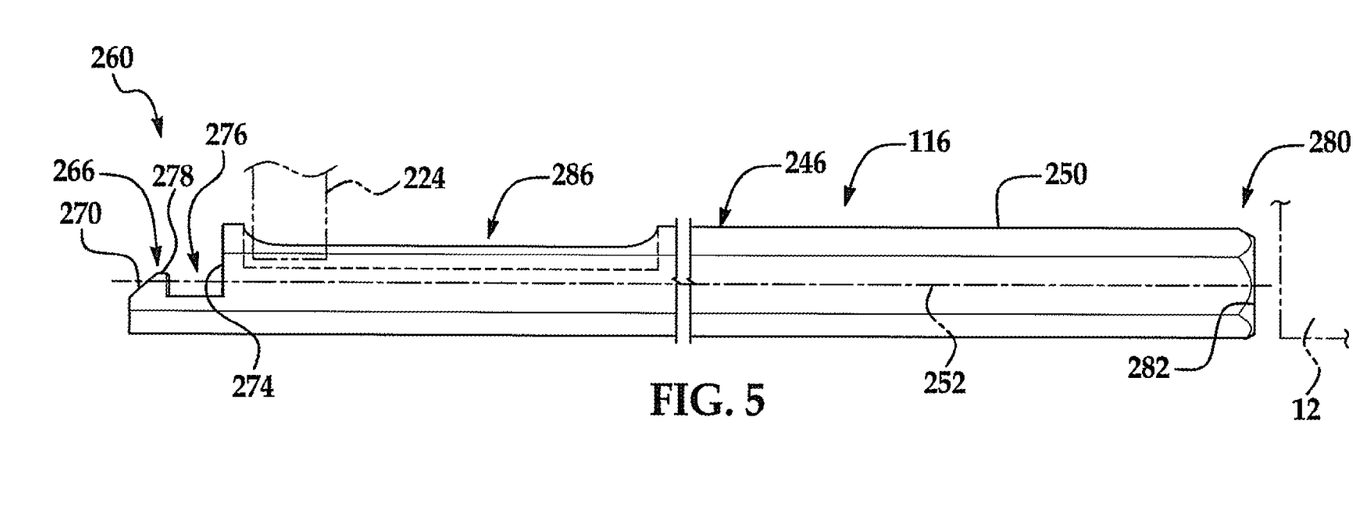
FIG. 5 is a side view of one example of a push rod that may be used as the first push rod in the sequence of push rods used to advance billets in a heating unit.

Referring to FIGS. 5-12, two alternate forms of push rods 116 suitable for use with the billet device 10 and methods hereafter described are illustrated. Referring to FIG. 5, a preferred first elongate push rod 246 is shown. First rod 246 includes an elongate shaft 250 extending along a longitudinal axis 252 and having a substantially hexagonal cross section with six facets 256 along its entire length and a first end 260 and a second end 280. In a most preferred example best seen in FIG. 7, there is a small flat 258 on the bottom portion of the exterior as generally shown. The preferred generally hexagonal outer surface provides lower opposing facets, which are angled substantially to coincide with the billet track 40 angular orientation of first rail 44 and 46 contact surfaces 45 and 47 as best seen in FIG. 13. These oriented lower facets further prevent the push rods 116 from rotating about their longitudinal axis 252 in the billet track 40.

Exemplary rod first end 260 includes an upward or first direction extending first hook 266 having an inclined surface 270 and a stop 274 defining a relief portion 276 extending below an apex 278 of the inclined surface 270 as generally shown.

Figures 10, 11, 12:
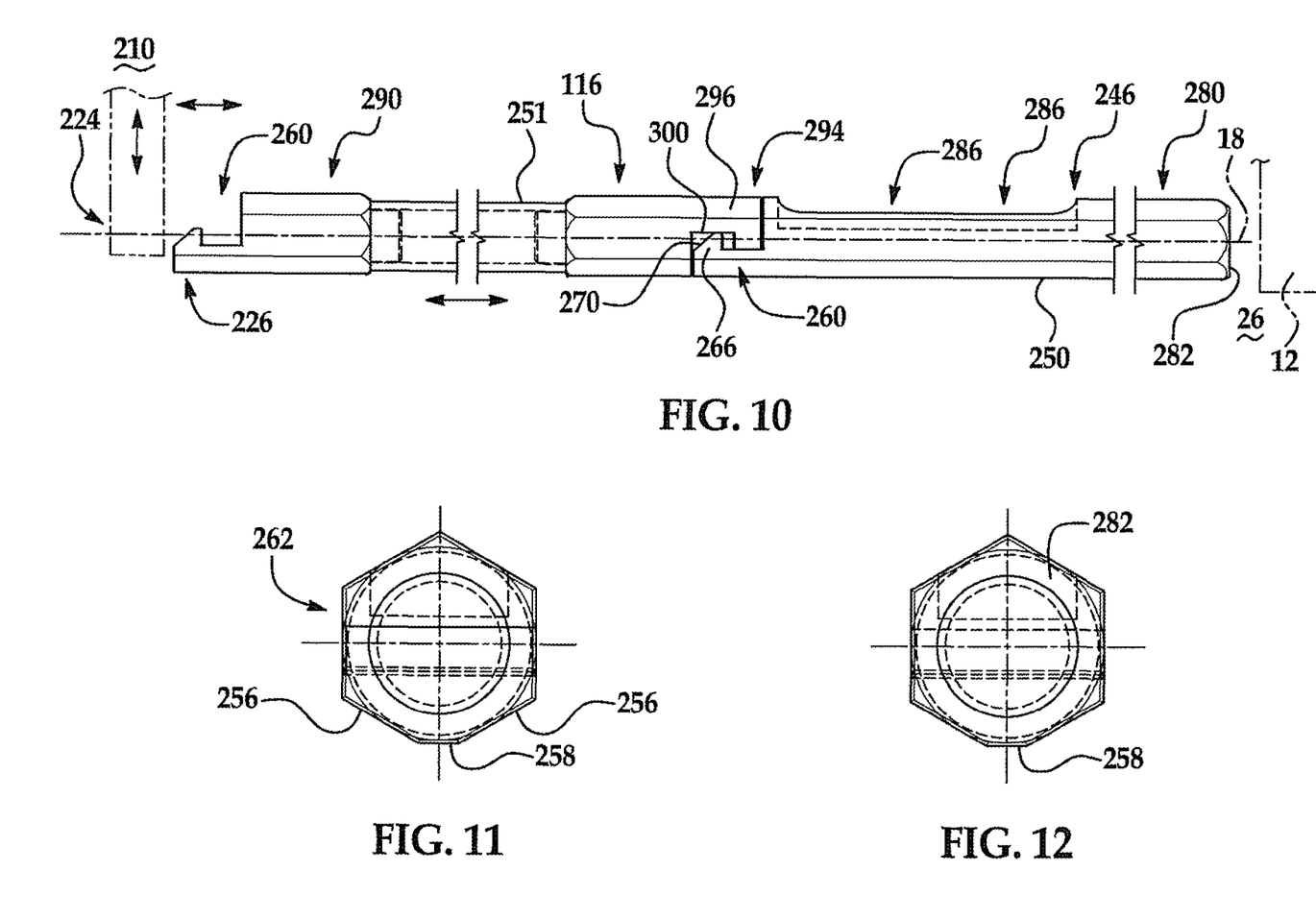
FIG. 10 is a side view showing the push rod of FIG. 5 interconnected to the push rod of FIG. 8.
FIG. 11 is a left end view of the push rod in FIG. 8.
FIG. 12 is a right end view of the push rod in FIG. 5.

Referring to FIGS. 10 and 12, first rod 246 second end 280 defines a billet abutment surface 282 to contact a last sequential billet 12 in the sequence of billets 12 to clear any remaining billets from the exemplary induction heaters.

Referring back to FIGS. 5 and 6, the exemplary first push rod 246 includes a return slot 286 positioned toward first end 260 and extends downward into shaft 250 as generally shown. In a preferred example, first rod 246 is positioned first and lowest on rack 110 and is the first push rod 116 to be positioned on the billet track 40 as further described below. As further described below, slot 286 is used to retract rod 246 toward the push rod rack 110 and return the rod 246 to an original position on rack 110 for the next billet changeover or shut down.

First push rod 246 is preferably solid stainless steel with the preferred above described and illustrated features. In one example, first push rod is approximately 56 inches (1422 mm) in total length and 1.75 inches (44.45 mm) across opposing cross sectional flats 256. Other materials, sizes, shapes, configurations and cross sectional features known by those skilled in the art may be used.

Figure 8A:
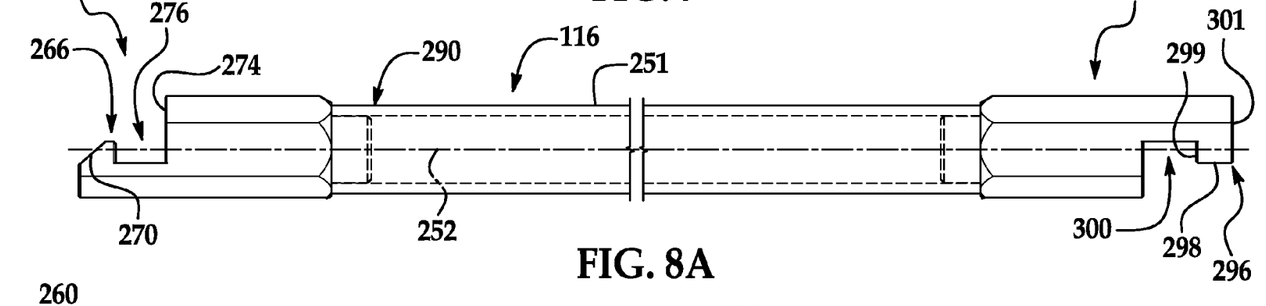
FIG. 8A is a side view of one example of an alternate push rod which may be used as a second push rod and subsequent push rods upstream of the push rod in FIG. 5.
Figure 8B:
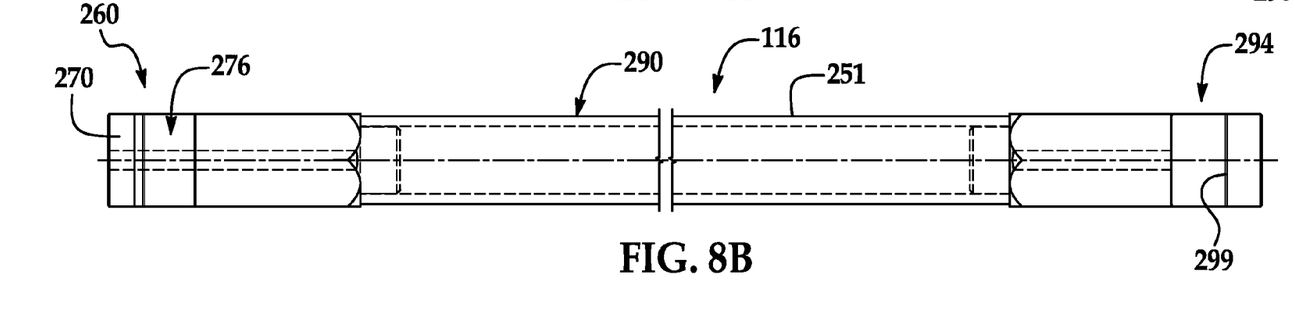
FIG. 8B is a top view of the push rod in FIG. 8A.

Referring to FIGS. 8A and 8B an example of a second push rod 290 is illustrated. In the example, second push rod 290 includes a hollow, circular, tubular stainless steel shaft 251 with open ends. The second push rod 290 first end 262 preferably includes the same upward or first direction extending first hook 266, stop 274, apex 278 and relief 276 structures as described for the first push rod 246 first end 260 described above. Second push rod 290 preferably has an alternate second end 294 that preferably includes an inverted or downward second direction extending second hook 296 having a top flat 298 and a catch surface 299 forming a relief 300 as generally shown. In the example, catch surface 299 is shown generally vertical from top flat 298. It is understood that catch surface can be at different angles, for example, angled outward toward abutment end 301 forming a catch or hook to better engage hook 266 which may similarly have a back angle on the coordinating surface to better catch or engage catch surface 301. In the preferred example, the first upward extending hook in the first direction is positioned 180 degrees opposite in orientation as the second downward extending hook 296. It is understood the hooks 266 and 299 can take other shapes, forms, structures and orientations providing a removable link or connection as known by those skilled in the art.

As best seen in FIG. 11, the first end 262 and second ends 294 are generally hexagonal in cross section as described for first push rod 246 and are preferably formed as separate pieces from solid stainless steel. Ends 262 and 2940 are partially inserted into respective ends of the hollow shaft 251 and secured through welding, mechanical fasteners or other joining or bonding means known by those skilled in the art.

Figure 9A:
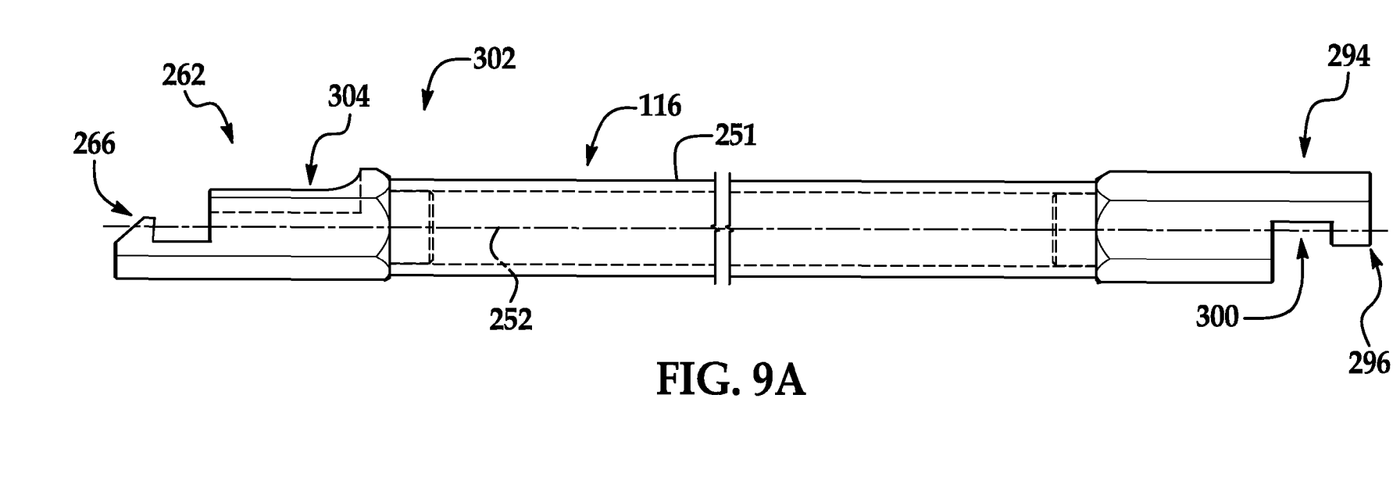
FIG. 9A is a side view of an alternate design of the push rod shown in FIG. 8A.
Figure 9B:
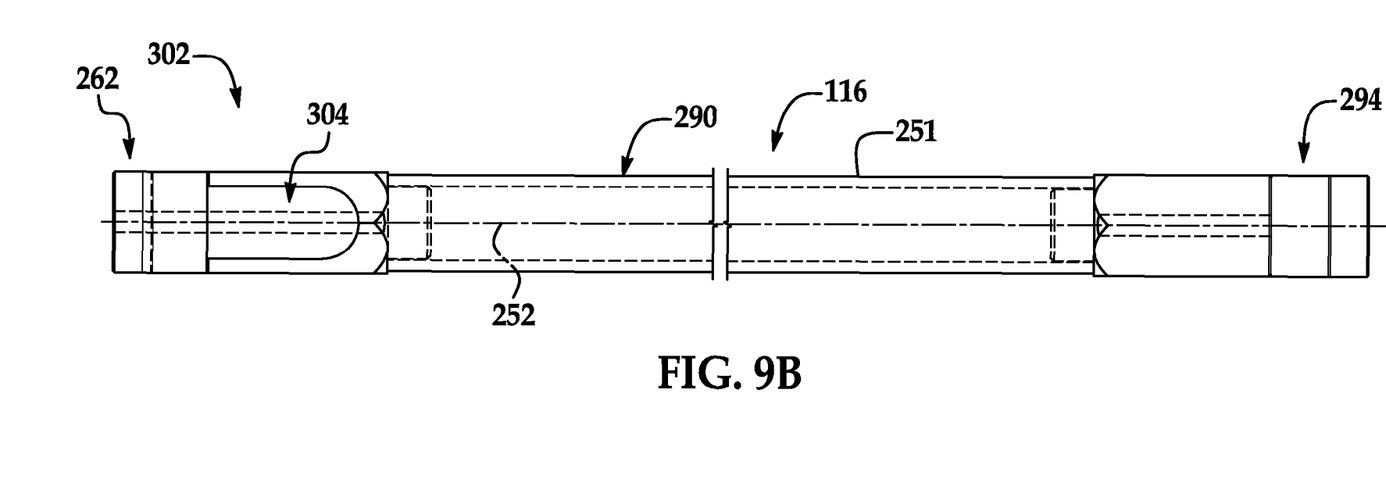
FIG. 9B is a top view of the push rod in FIG. 9A.

Referring to FIGS. 9A and 9B, an example of an alternate design 302 for second rod 290 first end 262 is generally shown. In the example, a slot 304 extends along longitudinal axis 252 and downwardly into rod end 262 as generally shown. In a preferred example, slot 304 is generally sized to accept advance cylinder piston end 224 therein so cylinder end 224 can abut and forcibly move rod 302, and any rods 116 connected thereto, along billet path of travel 18. It is understood that slot 304 may take other shapes, forms, sizes, depths and locations on rod 302 and be used for alternate purposes and functions.

It is understood that alternate second push rods 290 and 302 may take the same construction, materials, size, cross section and configuration as first push rod 246 and vice versa. It is further contemplated that the push rods may adopt some features of the other respective rods to compliment the other rods for the purposes described herein without deviating from the present invention. Although the Figures show a total of four (4) push rods 116 are used (1 first push rod 246 and 3 second push rods 290), it is understood that fewer or a greater number of push rods 116 may be used to suit the length of the induction heating unit line or other downstream process or track that needs to be cleared of billets or other substrates.

FIG. 10 illustrates the preferred engagement between the exemplary first push rod 246 and second push rod 290. As shown and more fully described below, through forcible contact between second rod 290 second end 294 and first rod 246 first end 260 by rapid advancement of the push rod interlink advance cylinder 240, second hook 296 is forced into, up and over first hook 266 incline 270 such that second hook 296 falls under the force of gravity into first rod 246 first end relief 276 as generally shown. In the illustrated position, first hook 266 and second hook 296 engage thereby removably interconnecting the first rod 246 and second rod 290 so they move as a single interlinked rod or unit in either direction along the billet path of travel 18. The same operation would apply for alternate second rod 302. It is understood that different structures and methods to connect or link first push rod 246 to second push rod 290 known by those skilled in the art may be used.

Billet device 10 further includes one or more programmable controllers (not shown) which are placed in electronic communication with the various cylinders, pinch rollers 54 and other structures which move the structural components, for example the push rod rack 110 and push rods 116, as described herein. The described movements and timing are sequentially coordinated between the various cylinders, pinch rollers, sensors and other devices through the controller(s), processor(s) and other devices as known by those skilled in the art.

Figure 14:
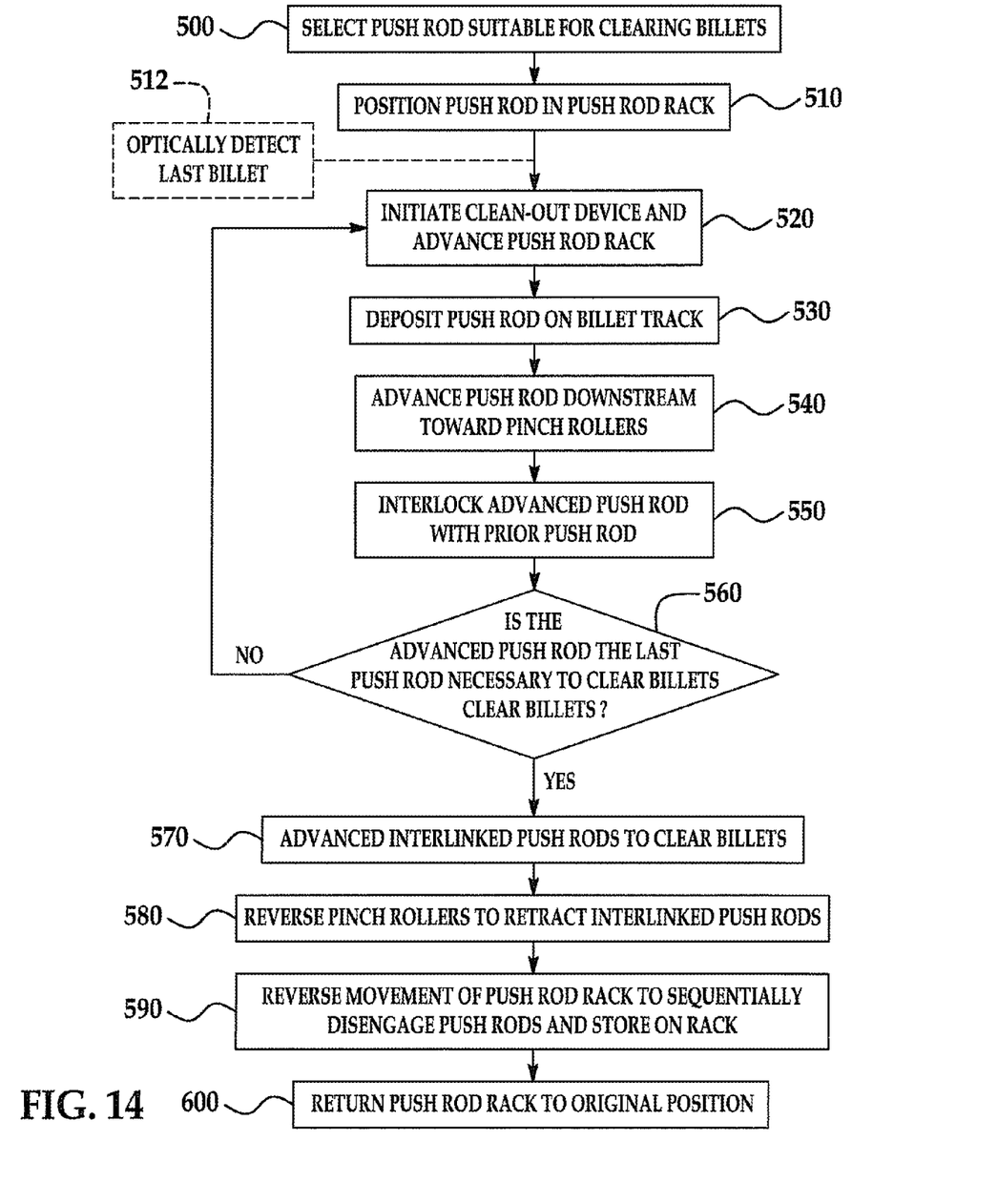
FIG. 14 is a schematic of an example of a process for clearing billets from a billet transfer line.

An example of a preferred operation of billet device 10 is described and process steps illustrated in FIG. 14. Referring to FIG. 1, billet device 10 is preferably fixedly connected to billet track support 20 and billet track 40 downstream of a billet feeder or hopper (not shown) inlet 20 and upstream of the pinch rollers 54 which feed billets into one or more downstream processing units, for example induction heaters (not shown). In normal operation, billets 12 are oriented and sequentially advanced, end-to-end from the inlet 20 on billet tracks 40 along billet path 18 through the pinch rollers and exemplary heating units.

In a preferred example, billet device 10 includes a selectively reciprocating push rod rack 110 having rack rails 160 for supporting a plurality of push rods 116. When it is anticipated that a product or billet changeover or stoppage of the line will occur, in first process step 500 a suitable push rod 116 for the application is selected. The selection of the type of rod and the quantity will be determined by the type of billets 12 that are presently in process and the length of the induction heating line.

Figure 6:
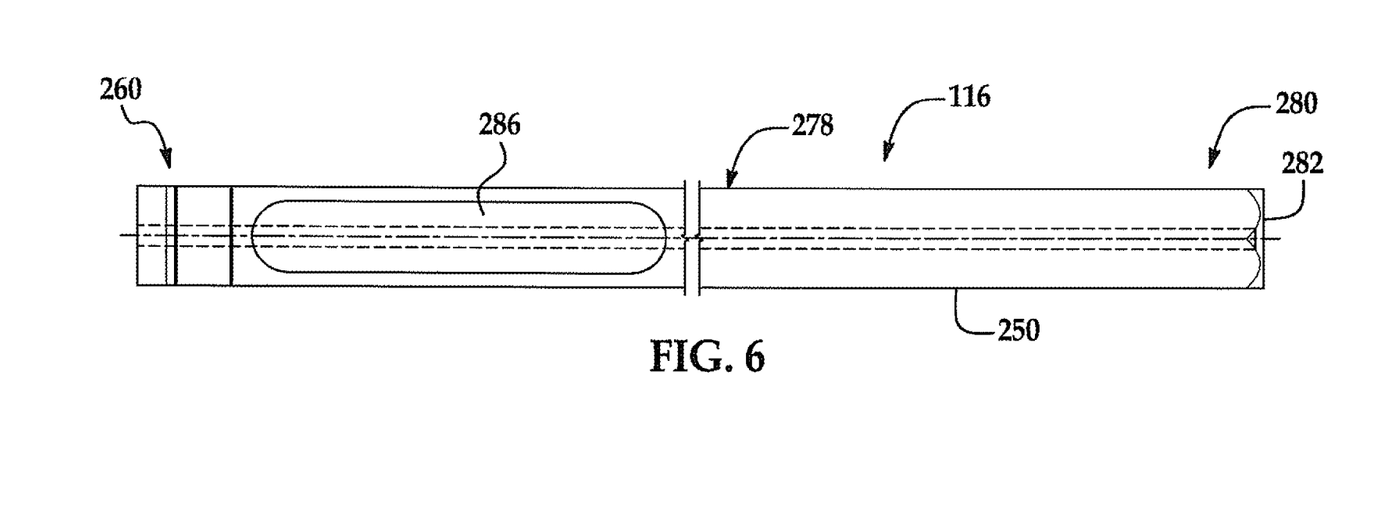
FIG. 6 is a top view of the push rod of FIG. 5.
Figure 7:
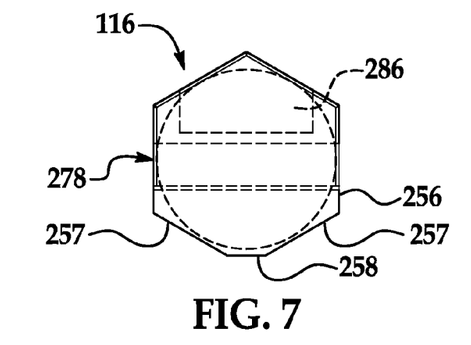
FIG. 7 is a left end view of the push rod in FIG. 5.

In process step 510, at least one push rod 116, and preferably a plurality of the selected push rods 116 are positioned in the push rod rack 110. Each individual push rod 116 is positioned in an aligned channel 186 in rack rails 160 with the first ends 260 and 262 positioned upstream and the second ends 280 and 294 positioned downstream toward the pinch rollers 54. In a preferred process, a first push rod 246 having a first end 260 and second end 280 as shown in FIGS. 5 and 6 is positioned on the lowest or most downward channel in rack rails 160. The necessary number of additional push rods 116 would preferably be of the second type of push rod 290 or 302 as shown in FIGS. 8 and 9, a single rod 116 positioned in successive channels on the rack rail 160.

On recognition that the last billet 12 in the current production run passes the billet device 10 along the billet path of travel 18, the billet clean-out device 10 is initiated in step 520. In an exemplary and optional step 515, an optical sensor or other type of sensor can be positioned at an appropriate place along billet path of travel 18 to signal or trigger initiation of the billet device in step 520. In one example, an optical sensor can be placed downstream of the billet device 10 and upstream of the pinch rollers 54. In normal operation when billets continue to pass the sensor, an optical beam is prevented from reaching a receiver on the other side of the billet track 40. When the last billet in the production line passed downstream of the beam, the beam is received by the receiver, which triggers operation of the billet device 10. It is understood that many other ways to sense or detect the end of a billet run and/or initiate operation of the billet device 10 through automated or manual methods known by those skilled in the art may be used.

On initiation of the billet device in step 520, a next process step 530 is push rod rack 110 carrying the selected type and number of push rods, preferably first push rod 246 followed by second push rods 290 or 302, is moved downward along guide rails 80 by cylinder 126. The first rack stop 190 of each rack rail 160 passes through the breaks 42 in billet track 40. As best seen in FIG. 13, continued movement of the push rod rack 110 and rack rails 160 places the first push rod 246 in abutting engagement with billet track second rail 46 thereby depositing first push rod 246 on the billet track 40 as generally illustrated. Once first push rod 246 is deposited on biller rails 44 and 46, downward movement of rack 110 along path 120 stops.

In step 540 as best seen in FIG. 10, the rod advance device 210 is activated to lower cylinder 216 piston end 224 to a vertical position lower than the highest portion of first hook 226, but higher than the billet track. Once piston end 224 is moved to its lower position, advance interlink cylinder 240 is activated to move cylinder 216 and piston end 224 downstream thereby abuttingly engaging piston end 224 with a first end 260 of first push rod 246 to accelerate downstream movement of first push rod 246 toward the pinch rollers 54. In an alternate process step not shown, piston end 224 can be inserted into first push rod 242 slot 286.

Continued movement of first push rod 246 downstream along path 18 most preferably places second end abutment surface 282 into contact with the trailing end of the last production billet 12 which has continued without interruption along the billet path of travel. In a preferred method step not shown, the device 10 detects when the first bar 246 first end 260 passes downstream in a similar or same manner as described above on detecting when the last billet 12 in the run passes a detector which initiates operation of device 10. When detected, and the predetermined number of push rods 116 to clear the billet line has not been positioned on the billet track 40, a signal is sent by the controller (not shown) to initiate operation of device 10 to place the next push rod 116, in the exemplary sequence the first of the second push rods 290, positioned on the rack 110 in the manner described above. In the exemplary use of alternate second push rod 302, piston end 224 is received in slot 304 abuttingly engaging the rod downstream end of the slot.

As best seen in FIG. 10, where at least one second push rod 290 has been sequentially deposited on billet track 40, on rapid advancement of the second push rod 290 toward the first end 260 of first push rod 246, the second hook 296 contacts the inclined surface 270 of downstream first hook 266. In this step 550, the speed and momentum of the second rod 290 by advance cylinder 240 pushes second hook 296 over the first hook 266 to engage and interlink the first push rod 246 with the second push rod 290 as generally shown.

In step 560, if the last push rod necessary for clearing the remaining billets has not been deposited on the billet track and advanced toward the pinch rollers, step 520 is repeated and the push rod rack 110 is advanced toward the billet track and the next successive push rod in the rack channel, preferably a third push rod 290 or 302 as shown in FIG. 8 or 9 is deposited on the billet track 40 in the manner described and advanced toward the previously deposited push rod, in the example above, first push rod 246.

If the last push rod 116 from the push rod rack 110 or otherwise necessary to clear the remaining billets from the induction heaters has been deposited, advanced and interlinked as described, the interlinked pushrods are advanced downstream along path 18 by the pinch rollers 54 until step 570 where the remaining billets are cleared. As this point, the last push rod on the billet track 40 remains in contact with the pinch rollers 54. Additional monitors or optical detectors can be employed such that on a predetermined advancement of the last push rod, pinch rollers 54 stop rotating to stop advancement of the push rods when the remaining billets in the induction heating units have been cleared. It is understood that optical or other detection units, or manual detection by a user, may be employed to stop advancement of the pinch rollers 54 or other mechanism urging the push rods downstream during the billet clearing process.

When the billets 12 have been cleared from the inducting heating units, or other downstream processes, the process is then to retract, preferably automatically, the interlinked push rods, separate them and return them to their original storage channels 186 in the push rod rack 110.

In one example of step 580 as best viewed in FIGS. 1 and 5, the pinch rollers 54 are reversed in rotation to forcibly begin moving the interlinked push rods 116 on billet track 40, and those extending into the induction heating units, upstream toward billet device 10.

In an exemplary and preferred step 590, when the last racked push rod to be positioned on the track 40 is positioned back upstream and aligned with billet device 10 and rack 110, preferably pinch rollers 54 stop and the rod rack 110 is reversed in direction along path 120 to contact and remove the aligned push rod 116 from the billet track 40. The transverse slots 276 and 300 allow the interlinked rods to easily separate from one another on contact of the push rod 116 with the stops 190 on the rack bars 160 as best seen in FIG. 13.

In a method step not shown, an optical detector or other detecting device can be positioned on the billet track 40 to detect when a push rod 116 is aligned with rack 110 and send a signal to a controller (not shown) to signal the pinch rollers 54 to stop rotation so the process of removing the aligned push rod from the interlinked rods described above can be completed. Likewise, an optical or other detector, for example mechanical limit switches, can signal when movement of rack bars 160 is sufficient to have removed the aligned push rod 116 from the billet track 40. The detector can then send an electronic signal to the controller to reinitiate rotation of the pinch rollers 54 to move the still remaining and interlinked push rods 116 upstream toward billet device 10 as described. As described above, other detection methods and operations known by those skilled in the art can be used. Preferably, this process continues until the last rod, for example push rod 246, is left remaining on the billet track.

In exemplary step 590, the last remaining push rod 246 on the track 40 is moved upstream toward billet device 10 as described above. On sufficient movement of first push rod 246 upstream, the rod 246 no longer remains in contact with the pinch rollers 254 and must be transferred further upstream for alignment with the device 10 and rack 110 to be removed from track 40. In a preferred example, first push rod slot 286 is used to assist retraction back toward the push rod rack 110. As described above, an optical or other detector may be used to detect and indicate when the remaining push rod 246 is no longer in contact with the pinch rollers 54 to initiate the process steps through signal to a controller or by other electronic or manual means, described immediately below.

In the preferred example, advance cylinder 240 indexes rod engagement cylinder 216 toward pinch rollers 54 to position cylinder piston end 224 over the first rod slot 286. The cylinder 216 is actuated moving the piston end 224 downward into the cavity of slot 286. The cylinder 240 then indexes back toward the push rod rack 110 thereby moving the rod 246 back toward push rod rack 110 and placing first push rod 246 into position to be re-engaged with rack rails 160 as described above. The last remaining rod 246 is then removed from the track 40 by the rack bars 160 and rack 110 as generally described above. Other methods of retracting the push rods 116, including the last remaining push rod 246, and engagement with rack 110 for removal from the track 40 known by those skilled in the art may be used. For example, it is contemplated that a programmed robot or other mechanical device (not shown) could remove the individual and interlinked rods from the billet track 40 and store them in rack 110 or other rack or fixture (not shown) adjacent the billet line 16.

In the final step 600, the push rod rack 110 is moved along path 120 to its original position wherein the first rack bar stops 190 clear of the billet track 40 and billet path of travel 18. This position is maintained until the billet device 10 detects a last billet 12 in a production run or other automatic or manual initiation of billet device 10 as described herein.

As described, the preferred billet device 10 through use of optical or other sensors and detectors, can operate automatically to clear billets 12 or other materials from downstream processes and then automatically be returned to an original storage position until a subsequent step or event triggers initiation of the exemplary device 10 and process 500 described herein.

It is understood that additional process steps, alternate process steps, alternate order of steps or deletion of process steps as described and illustrated may be used by those skilled in the art without deviating from the present invention. It is further understood that although billet device 10 is described as particularly useful for removing metallic billets used in an induction heating processing line, the billet device 10 can be used in other material processing and transfer applications known by those skilled in the art. In a most preferred example, device 10 is fully automatic. Once a last in line billet is detected downstream or manually triggered, device 10 automatically initiates sequential deposit of the predetermined push rods to clear the material or billets remaining in the process line, retracts the push rods toward the device 10 and removes the push rods from the material or billet track for storage on the push rod rack in the ways described until the process is initiated again.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A material transfer line clearing device for use in clearing material from a downstream portion of a processing line, the processing line having a material path of travel for moving the material along the path of travel, the clearing device comprising:
   at least one push rod;
   a push rod rack removably supporting the at least one push rod and positioned proximate to the material path of travel, the push rod rack adapted to selectively position the at least one push rod in the material path of travel;
   a push rod advance device for selectively moving the at least one push rod in a downstream or an upstream direction along the material path of travel; and
   a material track positioned along the material path of travel, the material track having two discontinuity breaks separated by a first distance along the material track, the material track supporting the material and at least one push rod when positioned on the material track.

2. The clearing device of claim 1 wherein the at least one push rod comprises:
   a first elongate push rod; and
   a second elongate push rod, the second push rod selectively interlinkable with the first push rod along the material path of travel.

3. The clearing device of claim 2 wherein the first push rod defines an elongate return slot positioned for selectively receiving a push rod advance device piston, the piston adapted to selectively engage the first push rod through the return slot and move the first push rod upstream for return positioning on the push rod rack.

4. The clearing device of claim 1 wherein the push rod rack further comprises:
   a piston for selectively and reciprocally moving the push rod rack along a rack path of travel relative to the material track; and
   a first and a second push rod rack bar, the first and the second rack bars each having a length and a plurality of channels positioned along the length for supporting and orienting the at least one push rod parallel to the material path of travel, the first and the second rack bars positioned the first distance apart to intersect and pass through the material track two discontinuity breaks on reciprocal movement of the push rod rack to selectively deposit the at least one push rod on the material track.

5. A billet transfer line clearing device for use in clearing billets from a downstream portion of an induction heating line, the clearing device comprising:
a billet track positioned along a billet path of travel for supporting a plurality billets, the billet track having a first track rail and a second track rail having a first angular position from the first track rail;
a billet advancement device positioned along the billet path of travel for moving a plurality of billets along the billet path of travel;
a first elongate push rod having a first end and a second end;
a second elongate push rod having a first end and a second end, the second push rod removably engagable with the first push rod;
a base positioned adjacent the billet track;
a push rod rack connected to the base, the push rod rack defining a plurality of channels each to support a respective one of the first or a second push rod parallel to the billet track;
a push rod rack reciprocating device connected to the push rod rack for selectively moving the push rod rack relative to the billet track to sequentially deposit or remove the first and the second push rods on the billet track;
a push rod advance device connected to the base, the push rod advance device including a rod engagement cylinder selectively movable along an advance path of travel parallel to the billet path of travel, the rod engagement cylinder having a piston selectively engagable with the first and the second push rods to selectively advance the engaged first or second push rod along the billet path of travel; and
a controller in electronic communication with at least one of the billet advancement device, push rod rack reciprocating device or push rod advance device.

6. The billet clearing device of claim 5 wherein:
the first push rod first end includes a hook and defines a relief oriented toward a first direction and the second end includes a billet abutment surface; and
the second push rod first end includes a hook and defines a relief oriented toward the first direction and the second end includes a hook and defines a relief oriented toward a second direction, the second direction oriented 180 degrees from the first direction, the first push rod first end complementary and removably engageable with the second end of the second push rod, the second push rod first end complementary and removably engagable with the second end of a subsequent second push rod positioned upstream of the second push rod positioned along the billet track.

7. The billet clearing device of claim 6 wherein:
the first push rod further includes an elongate slot positioned adjacent the first end relief, the slot adapted to receive the advance device piston to engage the advance device piston with the first push rod for selective movement of the first rod by the advance device along the billet path of travel.

8. The billet clearing device of claim 5 wherein the push rod rack further comprises:
a first rack bar and a second rack bar, each of the first and the second rack bars defining the plurality of channels respectively aligned to support respective first and the second push rods in a substantially horizontal position, each channel having a first channel surface and a stop having an angled surface in contact with the respective first or second push rod.

9. The billet clearing device of claim 8 wherein:
the first channel surface is parallel to a contact surface of the billet track first rail; and
the stop angled surface is parallel to a contact surface of the billet track second rail.

10. The billet clearing device of claim 9 wherein the first and second bar racks plurality of channels further comprise a second contact surface angularly positioned from the first channel surface and the stop angled surface.

11. The billet clearing device of claim 8 wherein the billet track further defines two discontinuity breaks separated by a first distance along the billet path of travel; and
the first bar rack and the second bar rack are angularly oriented with respect to the billet track and separated the first discontinuity distance from one another and respectively aligned with one of the discontinuity breaks, wherein the first and second bar racks pass through the respective discontinuity breaks to sequentially deposit or remove the first and the second push rods from the billet track.

12. The clearing device of claim 5 wherein the push rod rack is a cartridge removably mounted to the base adjacent the billet track.

13. The clearing device of claim 5 wherein the push rod advancement device further comprises:
a frame connected to the base;
an advance track connected to the frame and defining the advance path of travel, the advance track positioned parallel to the billet path of travel and engaged with the rod engagement cylinder; and
an advancement cylinder connected to the frame and the rod engagement cylinder, the advancement cylinder adapted to selectively move the rod engagement cylinder along the advance track path of travel to engage the respective first and the second push rods.

14. A method for clearing billets from a downstream portion of a processing line, the processing line having a billet track and a billet advancing device for moving a plurality of billets along a billet path of travel, the clearing method comprising the steps of:
positioning at least one push rod on a push rod rack positioned proximate to a billet track positioned along a processing line;
depositing the at least one push rod onto the billet track;
advancing the at least one push rod downstream along the billet track into abutting engagement with a last in line upstream billet on the billet track;
continuing advancement of the at least one push rod downstream along the billet track until the last in line upstream billet is downstream of predetermined portion of the processing line;
retracting the at least one pushrod upstream along the billet track in proximity to the push rod rack;
removing the at least one push rod from the billet track; and
depositing the at least one push rod back onto the push rod rack.

15. The clearing method of claim 14 wherein the step of advancing the at least one push rod downstream further comprises the steps of:
engaging a push rod advancement cylinder with the at least one push rod;

moving the push rod advancement cylinder downstream to move the engaged at least one first push rod downstream along the billet track; and engaging the at least one first push rod by a billet advancing device to abuttingly engage the at least one push rod with the last in line upstream billet on the billet track.

16. The clearing method of claim 14 wherein the at least one push rod comprises a first push rod and an independent second push rod:

the step of depositing at least one push rod onto the billet track comprises the steps of:

depositing a first push rod onto the billet track; and sequentially depositing a second push rod onto the billet track upstream of the first push rod; and the clearing method further comprising the steps of:

removably interlinking the second push rod with the first push rod;

unlinking the second push rod from the first push rod following retracting of the second push rod in proximity to the push rod rack.

17. The clearing method of claim 16 wherein:

the step of depositing the first push rod and the second push rod onto the billet track further comprise the step of moving a portion of the push rod rack through the billet track to respectively and sequentially position the first and the second push rods on the billet track; and the step of removing the at least one push rod further comprises moving a portion of the push rod rack through the billet track to engage the respective one of the first and the second push rods until all of the first and the second push rods are removed from the billet track and deposited on the push rod rack.

18. The clearing method of claim 14 wherein the method of retracting the at least one push rod further comprising the steps of:

moving a push rod advancement cylinder in proximity of the at least one push rod;

positioning a push rod advancement cylinder piston into a return slot defined by the at least one push rod;

engaging the push rod advancement cylinder piston with the at least one push rod; and moving the push rod advancement cylinder upstream to move the engaged at least one first push rod upstream along the billet track in proximity to the push rod rack.

19. A material transfer line clearing device for use in clearing material from a downstream portion of a processing line, the processing line having a material path of travel for moving the material along the path of travel, the clearing device comprising:

at least one push rod;

a push rod rack removably supporting the at least one push rod and positioned proximate to the material path of travel, the push rod rack adapted to selectively position the at least one push rod in the material path of travel; and a push rod advance device for selectively moving the at least one push rod in a downstream or an upstream direction along the material path of travel, the push rod advance device comprising:

a frame having an advance track positioned parallel to the material path of travel;

a push rod cylinder connected to and selectively movable along the advance track, the push rod cylinder having a piston movable to selectively engage the at least one push rod; and an advance device connected to the push rod cylinder for selectively moving the at least one push rod along the material path of travel when the piston is engaged with the at least one push rod.

* * * * *